(12) United States Patent
Lai

(10) Patent No.: US 10,523,506 B2
(45) Date of Patent: Dec. 31, 2019

(54) NETWORK CONFIGURATION METHOD AND NETWORK DEVICE

(71) Applicant: NANNING FUGUI PRECISION INDUSTRIAL CO., LTD., Nanning (CN)

(72) Inventor: Yi-Ting Lai, Hsin-Chu (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 134 days.

(21) Appl. No.: 15/667,601

(22) Filed: Aug. 2, 2017

(65) Prior Publication Data

US 2019/0044803 A1 Feb. 7, 2019

(51) Int. Cl.
| | | |
|---|---|---|
| H04L 12/24 | (2006.01) |
| H04L 12/715 | (2013.01) |
| H04L 12/46 | (2006.01) |
| H04L 12/751 | (2013.01) |
| H04L 12/753 | (2013.01) |

(52) U.S. Cl.
CPC ...... H04L 41/0816 (2013.01); H04L 12/4641 (2013.01); H04L 45/04 (2013.01); H04L 45/02 (2013.01); H04L 45/48 (2013.01)

(58) Field of Classification Search
None
See application file for complete search history.

(56) References Cited

U.S. PATENT DOCUMENTS

| | | | |
|---|---|---|---|
| 5,886,643 A | 3/1999 | Diebboll et al. | |
| 2004/0103179 A1* | 5/2004 | Damm | H04L 12/1886 709/223 |
| 2009/0252030 A1 | 10/2009 | Kashyap et al. | |
| 2011/0080915 A1* | 4/2011 | Baykal | H04L 12/42 370/395.53 |
| 2011/0158241 A1* | 6/2011 | Wang | H04L 12/42 370/395.53 |
| 2013/0286818 A1 | 10/2013 | Long et al. | |
| 2017/0085488 A1 | 3/2017 | Bhattacharya et al. | |
| 2017/0155522 A1* | 6/2017 | Fukaya | H04L 12/1868 |

FOREIGN PATENT DOCUMENTS

| | | |
|---|---|---|
| CN | 1929442 | 3/2007 |
| CN | 103378998 A | 10/2013 |

* cited by examiner

*Primary Examiner* — Rebecca E Song
(74) *Attorney, Agent, or Firm* — ScienBiziP, P.C.

(57) ABSTRACT

A network configuration method with automatic and periodic reviews of master and standby links can be executed by a first network device which is located in a first loop link, the first loop link also containing second and third network devices. The method comprises detecting a load of the first loop link, receiving second load information from the second network device, and third load information from the third network device. Determining whether the first network device is suitable as an owner node in the first loop link according to the first, second, and third load information, and configuring the first network device as the owner node in the first loop link upon the condition that the first network device is deemed suitable as such.

12 Claims, 4 Drawing Sheets

NETWORK CONFIGURATION METHOD AND NETWORK DEVICE

FIELD

The subject matter herein generally relates to network technologies, and more particularly to a network configuration method and a network device.

BACKGROUND

A traditional ring protection switching layout (e.g., Ethernet ring network protection switching) is generally used to switch a faulty link on an Ethernet ring network. The Ethernet ring network usually comprises a master link and a standby link. When the master link is in a normal working state, the standby link is in a unused state, for example, a data transmission function of the standby link is turned off. In contrast, when the master link becomes faulty, the standby link is switched on to ensure the reliability of a network link and protect an Ethernet service of the Ethernet ring network.

However, configuration operations of the traditional ring protection switching are inefficient, because many functions require complex manual configurations through maintenance teams. In addition, manual configurations may bring manual errors which may result in risks to proper functioning of network.

BRIEF DESCRIPTION OF THE DRAWINGS

Implementations of the present technology will be described, by way of example only, with reference to the attached figures, wherein.

DETAILED DESCRIPTION

Figure 1:
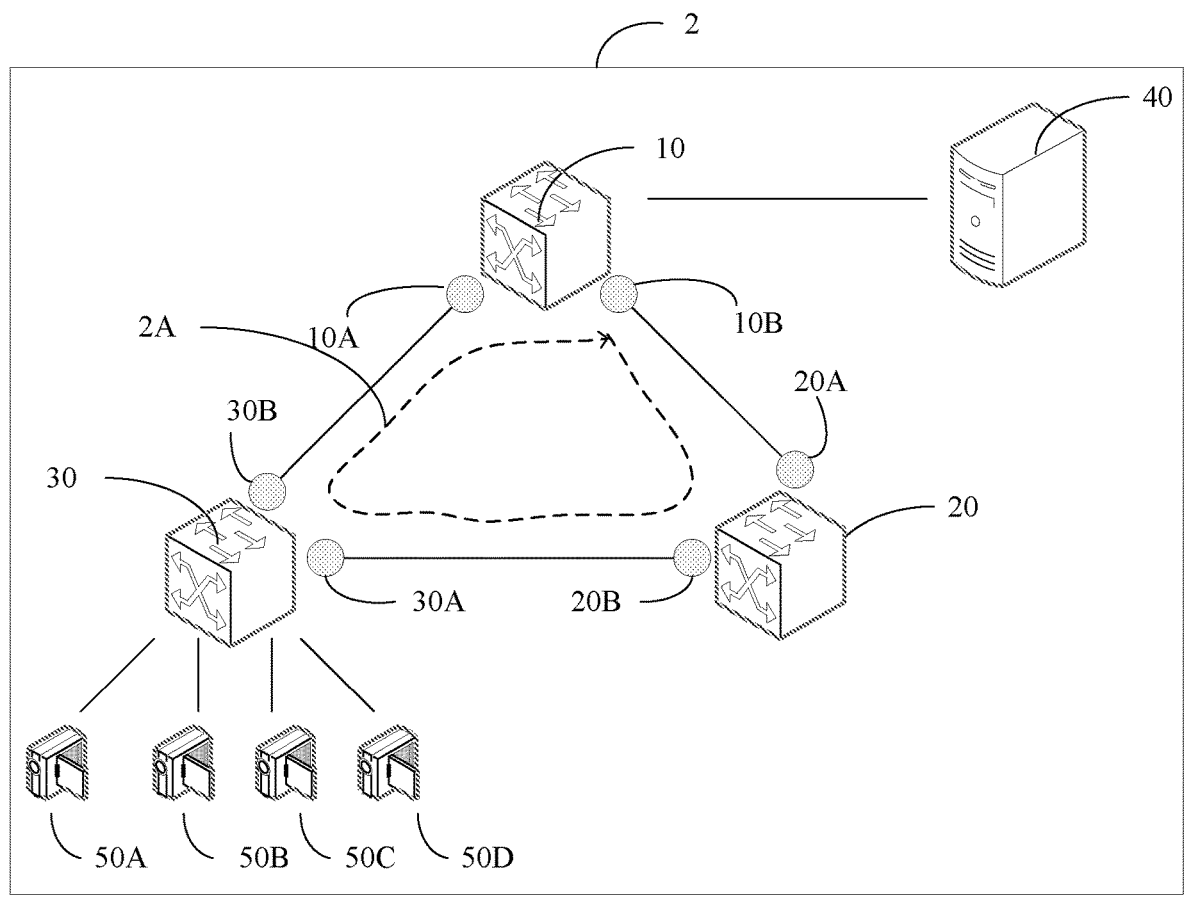
FIG. 1 illustrates an exemplary embodiment of a network environment comprising multiple network devices.

It will be appreciated that for simplicity and clarity of illustration, where appropriate, reference numerals have been repeated among the different fingers to indicate corresponding or analogous elements. In addition, numerous specific details are set fourth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

It should be noted that references to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when used, means "including, but not necessarily limited to"; it specifically indicates open-ended inclusion or membership in a so-described combination, group, series, and the like.

FIG. 1 illustrates an exemplary embodiment of a network environment comprising multiple network devices. In the exemplary embodiment, a network topology (network topology 2) comprises multiple network devices (e.g., 10, 20, and 30) which may be forwarding devices, for example, switches, routers, or the like. In the exemplary embodiment, a first network device 10, a second network device 20, and the third network device 30 form a loop link (i.e., a first loop link 2A). However, the exemplary embodiment illustrated in FIG. 1 is merely an example and is not intended to be limiting. More network devices may be located in the loop link between the second network device 20 and the third network device 30, such as a fourth network device, a fifth network device, and on.

Each network device 10, 20, and 30 comprises multiple ports, types of which can be monitored. In the exemplary embodiment, the multiple ports may be uplink/downlink ports, IPC/NVR ports connected to a terminal device (e.g., 50A-50D) or a server (e.g., 40), or the like. When a port is monitored to be an uplink port or an downlink port, data forwarding function of the port is turned off.

Each network device (e.g., 10-30) may transmit probe packets to the network topology 2 to discover one or more loop links (e.g., the first loop link 2A) which go through that network device. The network devices (e.g., 10-30) may assign ports for the first loop link 2A. For example, the first network device 10 may assign a first loop link port 10A and a second loop link port 10B, the second network device 20 may assign a third loop link port 20A and a fourth loop link port 20B, and the third network device 30 may assign a third loop link port 30A and a sixth loop link port 30B.

Exemplary embodiments of auto-configuring roles for the multiple network devices (e.g., 10-30) in the first loop link 2A will be described in more detail.

Figure 2:
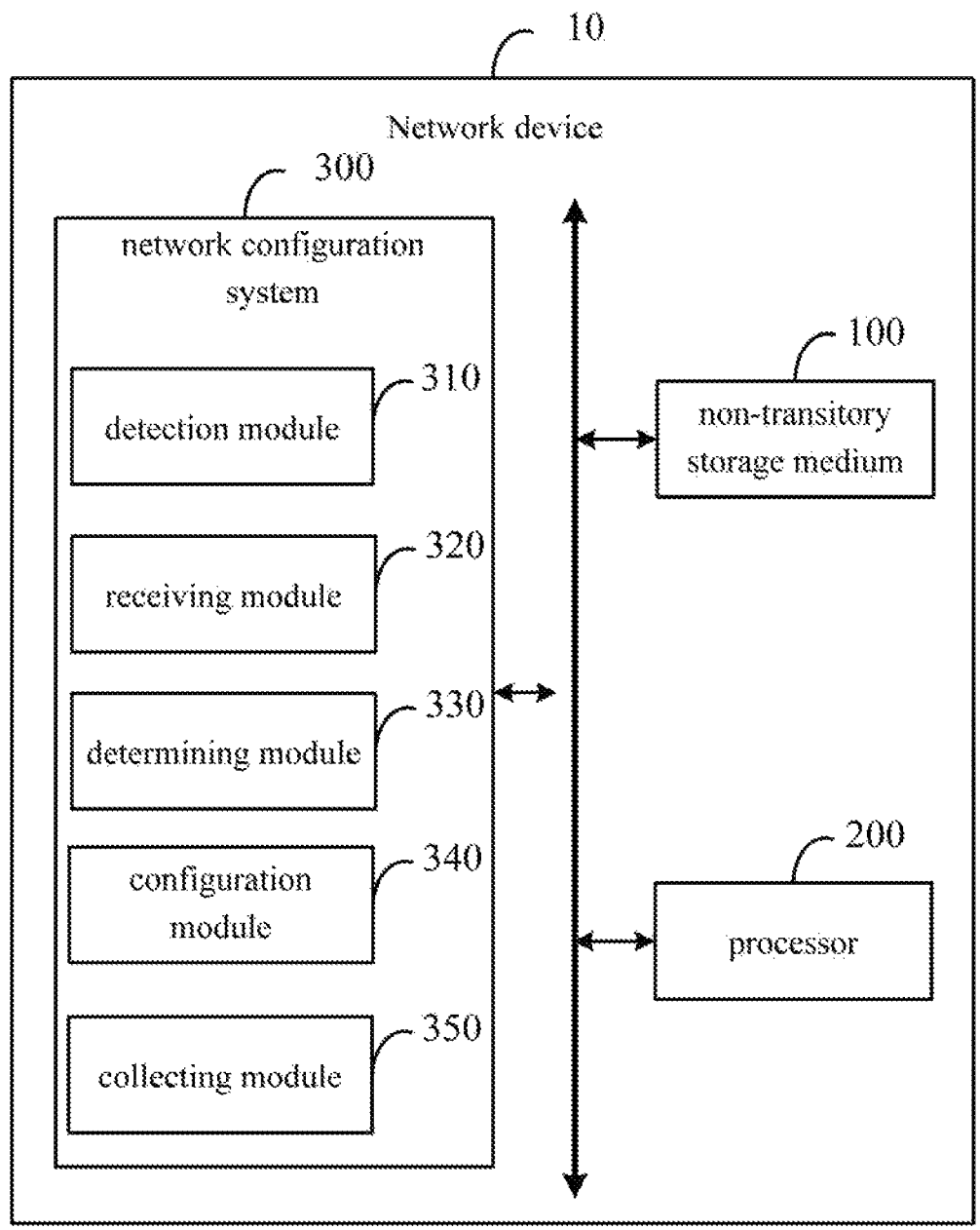
FIG. 2 illustrates a block diagram of an exemplary embodiment of functional modules of a network device.

FIG. 2 illustrates one exemplary embodiment of functional modules of the network device 10. The first network device 10 comprises a non-transitory storage medium 100, at least one processor 200, and a network configuration system 300. The network configuration system 300 comprises a detection module 310, a receiving module 320, a determining module 330, a configuration module 340, and a collecting module 350. The functions of each of the modules 310~350 are executed by one or more processors (e.g. by the processor 200). The non-transitory storage medium 100 can store code and data.

In relation to role configuration, the detection module 310 detects a load of the first loop link 2A to obtain first load information. In the exemplary embodiment, the first load information comprises a first time difference ΔT1 between the transmitting, by the first network device 10, of a first probe loop link packet used to bypass the first loop link 2A and receiving, by the first network device 10, the first probe loop link packet.

The receiving module 320 receives external load information from the other network devices in the first loop link 2A, for example, second load information and third load information. Wherein the second load information is obtained by the second network device 20 through detecting the load of the first loop link 2A, the third load information is obtained by the third network device 30 through detecting the load of the first loop link 2A. In the exemplary embodiment, the second load information comprises a second time difference ΔT2 between the transmitting, by the second network device 20, of a second probe loop link packet used to bypass the first loop link 2A and receiving, by the second network device 20, the second probe loop link packet. The third load information comprises a third time difference ΔT3 between the transmitting, by the third network device 30, of a third probe loop link packet used to bypass the first loop link 2A and receiving, by the third network device 30, the third probe loop link packet. The second network devices 20 periodically broadcasts the second load information, and the third network device 30 periodically broadcasts the third load information.

The determining module 330 determines whether the first network device 10 is suitable as an owner node in the first loop link 2A according to the first load information, the second load information, and the third load information. In the exemplary embodiment, the determining module 330 compares the first time difference ΔT1 with the second time difference ΔT2, and the third time difference ΔT3. The first network device 10 is determined as suitable for the role of the owner node upon the condition that the first time difference ΔT1 is not greater than either of the second time difference ΔT2 and the third time difference ΔT3. The first network device 10 is determined as not being a suitable owner node upon the condition that the first time difference ΔT1 is greater than one of the second time difference ΔT2 and the third time difference ΔT3.

The configuration module 340 configures the first network device 10 as the owner node in the first loop link 2A upon the condition that the first network device 10 is suitable as the owner node in the first loop link 2A. Both the second network device 20 and the third network device 30 may be configured as normal nodes, for example, the second network device 20 may be configured as a transit node in the first loop link 2A, and the third network device 30 may be configured as a neighbor node.

In the exemplary embodiment, the configuration module 340 may configure the second loop link port 10B as a Ring Protection Link (RPL) port, and block the RPL port. The RPL port is connected to the third network device 30 and forms an environmental protection link with the third network device 30.

In the exemplary embodiment, the configuration module 340 configures the first network device 10 as an normal node (e.g., transit node, or a neighbor node) in the first loop link 2A upon the condition that the first network device 10 is not a suitable owner node in the first loop link 2A.

In relation to VLAN configuration, in the exemplary embodiment, the first network device 10 is configured as the owner node, and both the second network device 20 and the third network device 30 are configured as the normal nodes in the first loop link 2A.

Configuration of VLAN Control will be described in more detail.

The collecting module 350 collects all VLANs of the first network device 10.

When all VLANs comprise one first VLAN that is present simultaneously in the second network device 20 and in the third network device 30, the configuration module 340 configures the first VLAN as a control VLAN in the first loop link 2A.

When all VLANs comprise multiple first VLANs, the configuration module 340 selects one of the multiple first VLANs as the control VLAN in the first loop link, and configures remaining first VLANs as data VLANs.

When none of the VLANs comprise the first VLAN, the configuration module 340 defines a new VLAN as the first VLAN and configures the new VLAN as the control VLAN.

Data VLAN configuration will be described in more detail.

The collecting module 350 collects all VLANs of the first network device 10.

When all VLANs comprise a second VLAN that controls data flow to a destination, the configuration module 340 configures the second VLAN as a data VLAN in the first loop link 2A.

Figure 3:
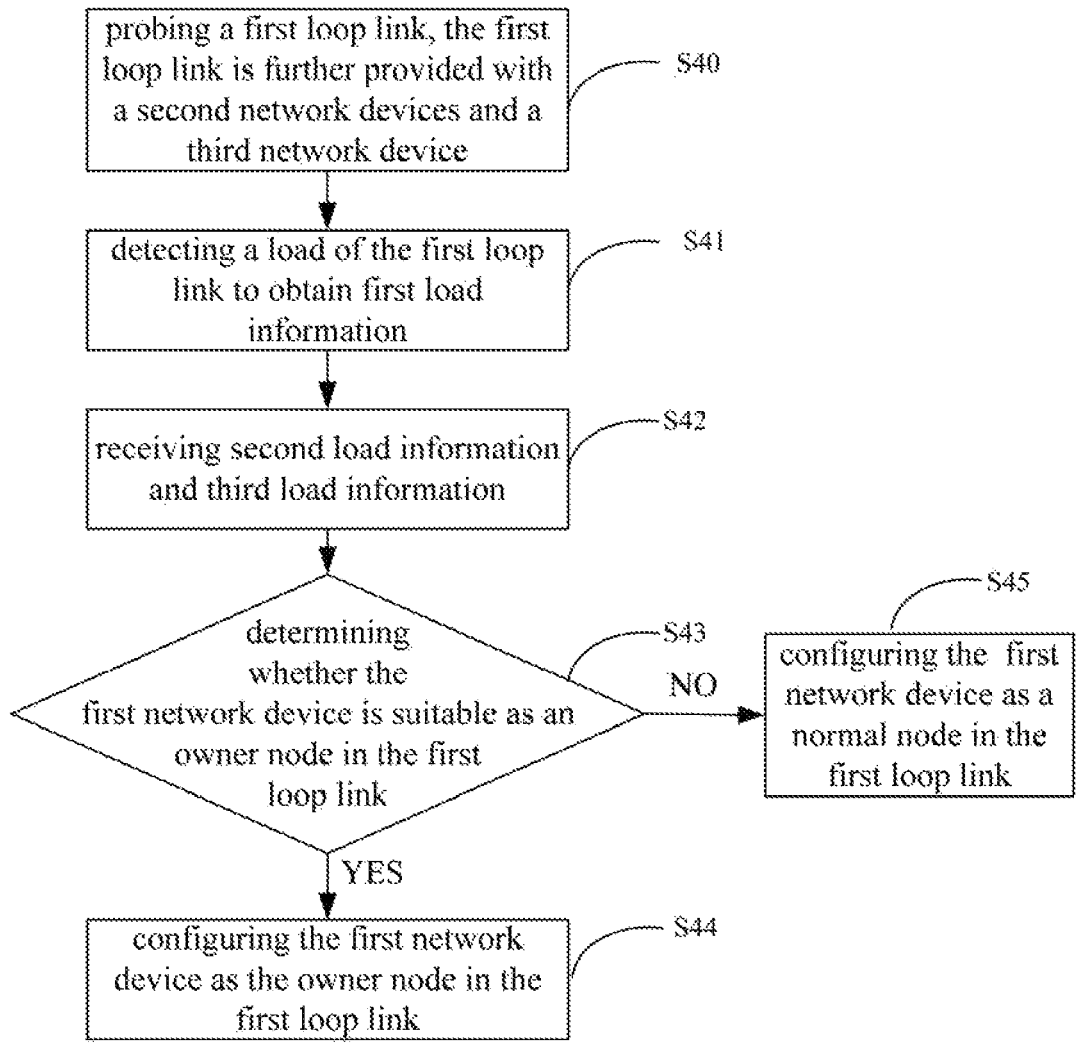
FIG. 3 illustrates a flowchart of an exemplary embodiment of a network configuration method.

FIG. 3 illustrates a flowchart of an exemplary embodiment of a network configuration method. The network configuration method is provided by way of example, as there are a variety of ways to carry out the method. The method described below can be carried out using the first network device 10 illustrated in FIG. 2, for example, and various elements of these fingers are referenced in explaining the processing method. The first network device 10 is not to limit the operation of the method, which also can be carried out using other devices. Each step shown in FIG. 3 represents one or more processes, methods, or subroutines, carried out in the exemplary processing method. Additionally, the illustrated order of blocks is by example only and the order of the blocks can change. The network configuration method begins at block S40.

At block S40, the first network device probes a first loop link, the first loop link further comprising multiple other network devices, such as a second network device and a third network device.

At block S41, the first network device detects a load of the first loop link to obtain first load information. In the exemplary embodiment, the first load information comprises a first time difference ΔT1 between the transmitting, by the first network device, of a first probe loop link packet used to bypass the first loop link and receiving, by the first network device, the first probe loop link packet.

At block S42, the first network device receives external load information from the other network devices, for example, second load information from the second network device and third load information from the third network device. Wherein the second load information is obtained by the second network device through detecting the load of the first loop link, the third load information is obtained by the third network device through detecting the load of the first loop link.

In the exemplary embodiment, the second load information comprises a second time difference ΔT2 between the transmitting, by the second network device, of a second probe loop link packet used to bypass the first loop link and receiving, by the second network device, the second probe loop link packet. The third load information comprises a third time difference ΔT3 between the transmitting, by the third network device, a third probe loop link packet used to bypass the first loop link and receiving, by the third network device, of the third probe loop link packet.

At block S43, the first network device determines whether the first network device is suitable as an owner node in the first loop link according to the first load information, the second load information and the third load information. If yes, the flowchart goes to block S44. If no, the flowchart goes to block S45.

In the exemplary embodiment, the first network device compares the first time difference ΔT1 with the second time difference ΔT2, and the third time difference ΔT3. It's determined that the first network device is suitable as the owner node upon the condition that the first time difference is not greater than either of the second time difference ΔT2 and the third time difference ΔT3. It's determined that the first network device is not suitable as an owner node upon the condition that the first time difference is greater than one of the second time difference ΔT2 and the third time difference ΔT3.

At block S44, the first network device configures the first network device as the owner node in the first loop link upon the condition that the first network device is suitable as the owner node in the first loop link.

In the exemplary embodiment, the first network device configures a RPL port on the first network device and block the RPL port. Wherein the RPL port is connected to the third network device and forms an environmental protection link with the third network device.

At block S45, the first network device configures the first network device as a normal node (e.g., transit node, or a neighbor node) in the first loop link.

Figure 4:
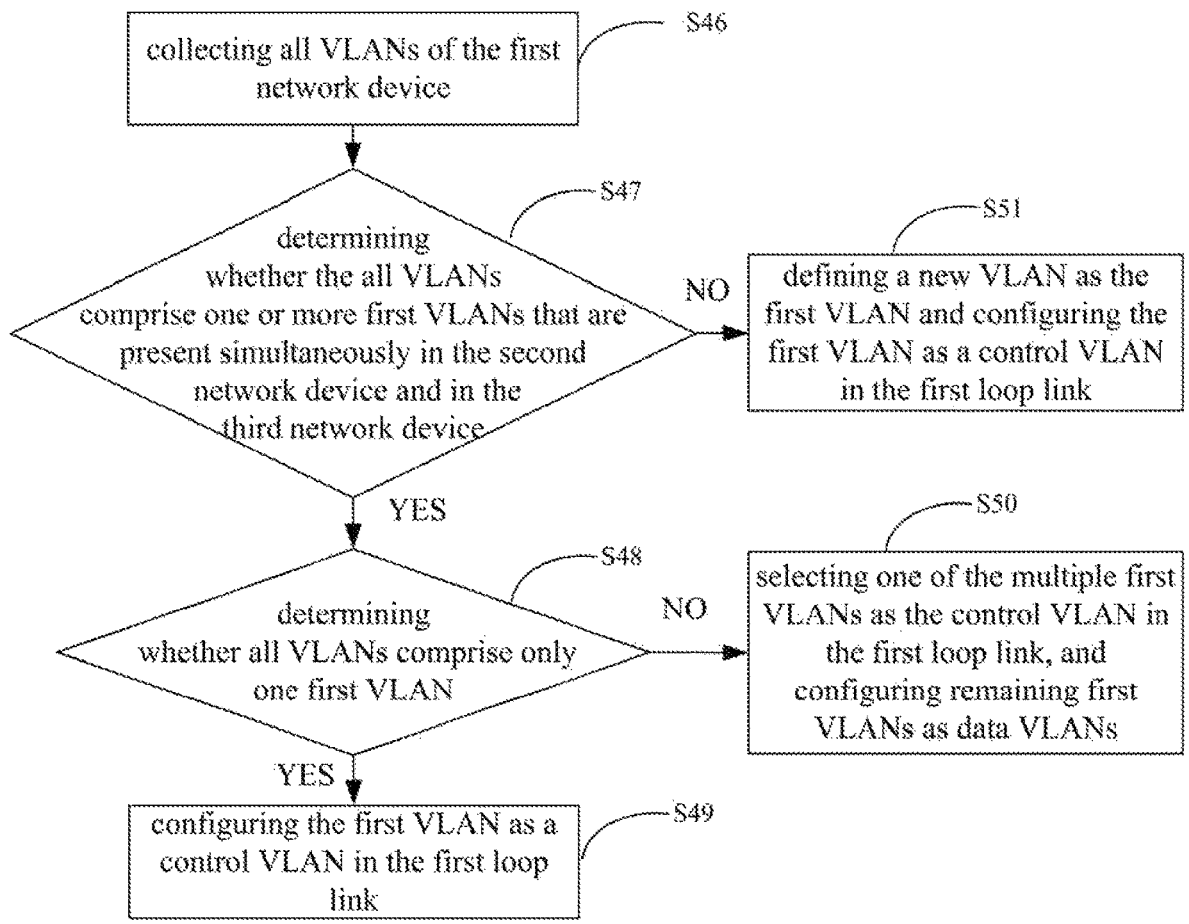
FIG. 4 illustrates a flowchart of an exemplary embodiment of a VLAN configuration.

FIG. 4 illustrates a flowchart of an exemplary embodiment of a VLAN configuration.

At block S46, the first network device collects all VLANs of the first network device.

At block S47, the first network device determines whether all VLANs comprise one or more first VLANs that are present simultaneously in the second network device and in the third network device. If yes, the flowchart goes to block S48. If no, the flowchart goes to block S51.

At block S48, the first network device determines whether all VLANs comprise only one first VLAN. If yes, the flowchart goes to block S49. If no, the flowchart goes to block S50.

At block S49, the first network device configures the first VLAN as a control VLAN in the first loop link. The process of auto-configuring control VLAN is terminated.

At block S50, the first network device selects one of the multiple first VLANs as the control VLAN in the first loop link, and configures remaining first VLANs as data VLANs. The process of auto-configuring control VLAN is terminated.

At block S51, the first network device defines a new VLAN as the first VLAN and configures the first VLAN as the control VLAN in the first loop link. The process of auto-configuring control VLAN is terminated.

It should be emphasized that the above-described exemplary embodiments of the present disclosure, including any particular embodiments, are merely possible examples of implementations, set fourth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A network device comprising:
   at least one processor;
   a non-transitory storage medium coupled to the at least one processor and configured to store one or more programs to be executed by the at least one processor, the one or more programs including instructions for:
   probing a first loop link, the first loop link further comprising multiple other network devices;
   detecting a load of the first loop link by the network device to obtain a first load message;
   receiving a plurality of second load messages respectively from the other network devices, wherein the plurality of second load messages are obtained by the other network devices through detecting the load of the first loop link;
   determining whether the network device is suitable as an owner node in the first loop link according to the first load message and the plurality of second load messages;
   configuring the network device as the owner node in the first loop link upon the condition that the network device is suitable as the owner node in the first loop link;
   collecting all virtual local access networks (VLANs) of the network device;
   when the all VLANs comprise one first VLAN that is present simultaneously in each of the multiple other network devices, configuring the first VLAN as a control VLAN in the first loop link;
   when the all VLANs comprise multiple first VLANs, selecting one of the multiple first VLANs as the control VLAN in the first loop link, and configuring remaining first VLANs as data VLANs; and
   when none of the all VLANs comprise the first VLAN, defining a new VLAN as the first VLAN.

2. The device of claim 1, wherein:
   the first load message comprises a first time difference between the transmitting, by the network device, of a first probe loop link packet used to bypass the first loop link and receiving, by the network device, the first probe loop link packet;
   the plurality of second load messages comprise second time differences each is a time difference between the transmitting, by a corresponding network device of the other network devices, of a second probe loop link packet used to bypass the first loop link and receiving, by the corresponding network device, the second probe loop link packet;
   wherein the determining step further comprises:
   comparing the first time difference with each of the second time differences;
   determining that the network device is suitable as the owner node upon the condition that the first time difference is not greater than either of the second time differences; and
   determining that the network device is not suitable as the owner node upon the condition that the first time difference is greater than one of the second time differences.

3. The device of claim 1, the configuring step further comprise:
   configuring a ring protection link (RPL) port on the network device and blocking the RPL port, wherein the RPL port is connected to one of the other network devices and forms an environmental protection link with the one of the other network devices.

4. The device of claim 1, further comprising:
   collecting all VLANs of the network device; and
   when the all VLANs comprises a second VLAN that controls data flow to a destination, configuring the second VLAN as a data VLAN in the first loop link.

5. A network configuration method, executed by a first network device which locates in a first loop link, wherein the first loop link is further provided with a second network device and a third network device, the method comprising:
  detecting a load of the first loop link to obtain first load information;
  receiving second load information and third load information, wherein the second load information is obtained by the second network device through detecting the load of the first loop link, the third load information is obtained by the third network device through detecting the load of the first loop link;
  determining whether the first network device is suitable as an owner node in the first loop link according to the first load information, the second load information and the third load information;
  configuring the first network device as the owner node in the first loop link upon the condition that the first network device is suitable as the owner node in the first loop link;
  collecting all virtual local access networks (VLANs) of the first network device;
  when the all VLANs comprise one first VLAN that is present simultaneously in the second network device and in the third network device, configuring the first VLAN as a control VLAN in the first loop link;
  when the all VLANs comprise multiple first VLANs, selecting one of the multiple first VLANs as the control VLAN in the first loop link, and configuring remaining first VLANs as data VLANs; and
  when none of the all VLANs comprise the first VLAN, defining a new VLAN as the first VLAN.

6. The network configuration method of claim 5, wherein:
  the first load information comprises a first time difference between the transmitting, by the first network device, of a first probe loop link packet used to bypass the first loop link and receiving, by the first network device, the first probe loop link packet;
  the second load information comprises a second time difference between the transmitting, by the second network device, of a second probe loop link packet used to bypass the first loop link and receiving, by the second network device, the second probe loop link packet;
  the third load information comprises a third time difference between the transmitting, by the third network device, of a third probe loop link packet used to bypass the first loop link and receiving, by the third network device, the third probe loop link packet;
  wherein the determining step further comprises:
  comparing the first time difference with the second time difference, and the third time difference;
  determining that the first network device is suitable as the owner node upon the condition that the first time difference is not greater than either of the second time difference and the third time difference; and
  determining that the first network device is not suitable as the owner node upon the condition that the first time difference is greater than one of the second time difference and the third time difference.

7. The network configuration method of claim 5, wherein the configuring step further comprises:
  configuring a ring protection link (RPL) port on the first network device and blocking the RPL port, wherein the RPL port is connected to the second network device or the third network device, and forms an environmental protection link with the second network device or the third network device.

8. The network configuration method of claim 5, further comprising:
  collecting all VLANs of the first network device; and
  when the all VLANs comprise a second VLAN that controls data flow to a destination, configuring the second VLAN as a data VLAN in the first loop link.

9. A non-transitory storage medium storing executable program instructions which, when executed by a processing system in a first network device, cause the processing system to perform a method comprising:
  detecting a load of the first loop link to obtain first load information, wherein the first loop link comprising the first network device a second network device and a third network device;
  receiving second load information and third load information, wherein the second load information is obtained by the second network device through detecting the load of the first loop link, the third load information is obtained by the third network device through detecting the load of the first loop link;
  determining whether the first network device is suitable as an owner node in the first loop link according to the first load information, the second load information and the third load information;
  configuring the first network device as the owner node in the first loop link upon the condition that the first network device is suitable as the owner node in the first loop link;
  collecting all virtual local access networks (VLANs) of the first network device;
  wherein when the all VLANs comprise one first VLAN that is present simultaneously in the second network device and in the third network device, configuring the first VLAN as a control VLAN in the first loop link;
  wherein when the all VLANs comprise multiple first VLANs, selecting one of the multiple first VLANs as the control VLAN in the first loop link, and configuring remaining first VLANs as data VLANs; and
  wherein when none of the all VLANs comprise the first VLAN, defining a new VLAN as the first VLAN.

10. The medium of claim 9, wherein:
  the first load information comprises a first time difference between the transmitting, by the first network device, of a first probe loop link packet used to bypass the first loop link and receiving, by the first network device, the first probe loop link packet;
  the second load information comprises a second time difference between the transmitting, by the second network device, of a second probe loop link packet used to bypass the first loop link and receiving, by the second network device, the second probe loop link packet;
  the third load information comprises a third time difference between the transmitting, by the third network device, of a third probe loop link packet used to bypass the first loop link and receiving, by the third network device, the third probe loop link packet;
  wherein the determining step further comprises:
  comparing the first time difference with the second time difference, and the third time difference;
  determining that the first network device is suitable as the owner node upon the condition that the first time difference is not greater than either of the second time difference and the third time difference; and determining that the first network device is not suitable as the owner node upon the condition that the first time difference is greater than one of the second time difference and the third time difference.

11. The medium of claim 9, the configuring step further comprises:
configuring a ring protection link (RPL) port on the first network device and blocking the RPL port, wherein the RPL port is connected to the second network device or the third network device, and forms an environmental protection link with the second network device or the third network device.

12. The medium of claim 9, further comprising:
collecting all VLANs of the first network device; and
wherein when the all VLANs comprise a second VLAN that controls data flow to a destination, configuring the second VLAN as a data VLAN in the first loop link.

* * * * *